J. CULBERTSON.
Grinding Mill.
No. 16,325.
2 Sheets—Sheet 1.
Patented Jan. 6, 1857.
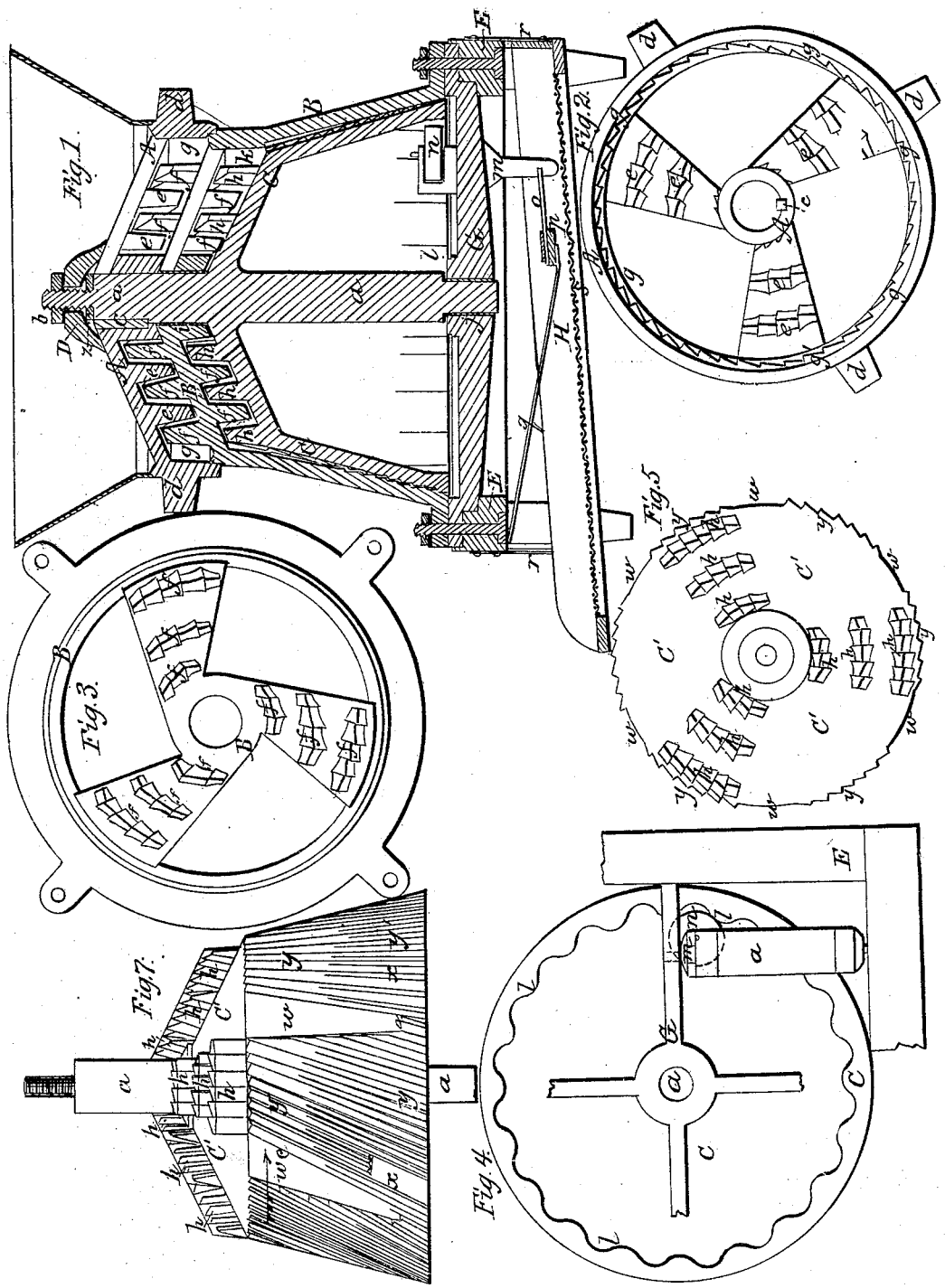

J. CULBERTSON.
Grinding Mill.
No. 16,325.
2 Sheets—Sheet 2.
Patented Jan. 6, 1857.
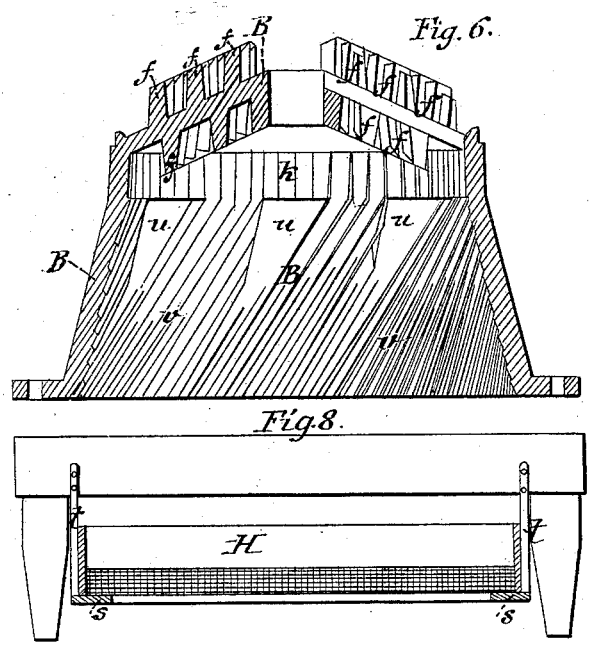

UNITED STATES PATENT OFFICE.

JAMES CULBERTSON, OF COVINGTON, KENTUCKY.

IMPROVEMENT IN GRINDING-MILLS.

Specification forming part of Letters Patent No. 16,325, dated January 6, 1857.

*To all whom it may concern:*

Be it known that I, JAMES CULBERTSON, of Covington, in the county of Kenton and State of Kentucky, have invented a new and Improved Portable Grinding-Mill; and I do hereby declare that the following is a full and exact description thereof, reference being had to the accompanying drawings, making part of this specification.

Figure 1 is a vertical section in the center of the mill; Fig. 2, a view of the under side of the driver; Fig. 3, a top view of the outer cone or shell; Fig. 4, a bottom view of the inner cone or burr; Fig. 5, a top view of the same; Fig. 6, a vertical section of the outer cone or shell; Fig. 7, a side elevation of the inner cone or burr; Fig. 8, a side view of the lower part of the mill-frame containing the sieve.

Like letters designate corresponding parts in all the figures.

The nature of my invention consists in the combined arrangement of feeding and discharging channels respectively in the top and bottom of the peripheral surface of the inner cone or burr.

The grinding portion of the mill is composed of three parts—viz., the driver or breaker A, to which the power is applied, the outer stationary cone or shell B, and the inner revolving cone or burr C. The driver A is coupled to the spindle $a$ by a key $c$ or its equivalent, and is composed of a central ring or hub, an outer rim provided with studs $d\ d\ d$, by which the driving-lever is attached on the outside, and on the inside with a series of cutting projections or teeth $g\ g\ g'\ g'$, and of three or more radial bars or spokes which connect the hub and rim and are provided on their under side, with concentric notched teeth $e\ e$, arranged substantially as represented in Figs. 1 and 2. There are teeth on the outer surface of the hub, as seen in Fig. 2. The teeth on the inner periphery of the driver are arranged in portions $g\ g$, extending inward nearly to the teeth $f\ f$ of the shell B, alternating with other portions $g\ g'$, sunk or retreating outwardly, so as to leave a considerably wider space between them and said teeth $f\ f$. The object of this arrangement is to open alternately a wide space to admit pieces of cobs and then to close and force said pieces against the teeth $f\ f$ and crush them, whereby the crushing proceeds more rapidly and any tendency to clogging is obviated. The outer cone or shell B is also provided at the top with a central hub, from which three or more radial bars extend to the outer shell. They slope downward from the center, as represented, as also do the bars of the driver, the latter generally sloping a little less than the former. Notched concentric teeth $f\ f$ of the same construction as those described on the driver are formed both upon the upper and under sides of these radial bars, substantially as shown in Figs. 1, 3, and 6. Those on the upper side are arranged so as to pass between the teeth $e\ e$ of the driver, leaving narrow spaces between the projections of the one and those of the other. A portion of the upper part of the outer shell equal in depth to the length of the teeth $f\ f$ is nearly cylindrical, or has its inner surface parallel with the sides of the adjacent teeth of the burr, and is provided with vertical grooves and ridges $k$, as seen in Fig. 6, arranged in alternate projecting and retreating portions in the same manner as those of the driver above described.

The flaring or conical portion of the shell is provided with furrows $v\ v$, winding on its inner surface, as seen in Fig. 6, being less in number and deeper at the top and finer and shallower at the bottom. At intervals there are formed in the upper portions of this grinding-surface wide-open channels $u\ u$ for the purpose of facilitating the passage of the crushed grain down between the surfaces of the cones. The shell is permanently secured to the frame E of the mill.

The inner cone or burr C is generally cast in one piece with its spindle $a$. It upper surface slopes downward from the spindle in lines nearly parallel with the direction of the radial arms of the shell and driver, as represented in Fig. 1, and thus forms a blunt cone. This portion is provided with three or more radial rows of teeth $h\ h$, similar in construction and arrangement to the teeth $e\ e$ and $f\ f$ of the driver and shell. These teeth revolve in the spaces between the lower teeth $f\ f$ of the shell just as the teeth $e\ e$ of the driver pass between the upper teeth $f\ f$. The portions of the surface of this cone between the teeth $h$ $h$ are smooth and unencumbered by any projections, as seen at C' C', Figs. 5 and 7, and occupy, say, as much space as is included between the radial bars of the shell and driver. These open smooth unencumbered spaces on the top of the burr allow the ears of corn to fall at once down between the rows of teeth $h$ $h$, so that the ears are at once seized by said teeth and crushed and cut in pieces by meeting the teeth on the stationary cone or shell. Thus the mill feeds and crushes as fast and as effectually as desired. Besides, as soon as crushed the grain passes freely down between the grinding-surfaces, since there is nothing in the way to impede the action of its gravity to that effect, no teeth or projections being upon those blank spaces of the burr for the particles to lodge against. The feed of the mill also becomes self-adjusting, since if the crushing proceeds faster than the grinding the open spaces C' C' partially fill up with crushed grain and do not allow so many ears to fall into the crusher; and if the grinding gains upon the crushing more room is thereby opened for admitting the ears into the crusher. The furrows $y$ $y$ on the peripheral surface of the burr C wind somewhat around the surface in the proper direction to have a tendency to work the meal downward in revolving, as shown in Fig. 7. These furrows are deeper and fewer at the top than at the bottom, as at $y'$ $y'$, being thus adapted to act upon larger particles at the top and grind them finer and finer as they descend toward the bottom.

I employ a peculiar arrangement of feeding-channels $w$ $w$ at the top and of discharging-channels $x$ $x$ at the bottom, as follows: The feeding-channels $w$ $w$ are formed at suitable intervals around the periphery, being somewhat wider and deeper at the top than at the bottom. They extend downward to no great distance from the bottom of the burr, as represented. These, in connection with the feeding-channels $u$ $u$ on the inner surface of the shell B, allow grains of corn and pieces of cobs of considerable size to be admitted for pulverizing. The operation of these grooves, extending as they do nearly to the bottom of the grinding-surfaces, is to become filled with coarse grains and particles at the top, while the finer particles sift down between the coarser ones. Thus these channels will continually be kept filled with particles coarse at the top, but finer and finer toward the bottom, till at the lower ends thereof the meal is nearly fine enough to be discharged. Thereby the particles so arrange and regulate themselves that the amount of grinding-surface they are still to be subjected to is in the ratio of their degree of coarseness and consequent need of further pulverizing. The discharging-channels $x$ $x$ extend up from the bottom somewhat higher than the lower ends of the feeding-channels. They are situated quite close to the feeding-channels on the side just preceding them, as the burr revolves, as shown in Fig. 7, in which the arrow indicates the direction of motion in revolving. By this arrangement the meal, which in the bottom of the feeding-channels is about fine enough to be discharged, is only subjected to so much grinding-surface as exists between the respective feeding-channels and the next following discharging-channels and then fall out, whereas otherwise it would pass into the next feeding-channels or continue between the grinding-surfaces till it is slowly discharged by the furrows. Thus I am enabled to grind very much faster than by any other arrangement heretofore in use, and at the same time grind quite as fine meal; and the furrows are thereby kept much clearer, not being liable to clog with fine meal packed or pressed into them, as the fine portions of the meal do not have to descend through the whole length of the furrows before they can be discharged.

A great objection to most conical mills is that the cones do not run concentrically, and consequently either rub against one another and thereby soon wear out, or must be separated so far as not to grind sufficiently fine. Besides, being close together on one side and wide apart on the other, a portion of the meal ground will be fine and a portion coarse. My method of permanent adjustment entirely obviates this objection and is accomplished in the following manner: The burr is first chucked in a lathe and the journals of the spindle $a$ turned off precisely concentric with the periphery. The eye of the stationary cone or shell B is made somewhat larger than the journal of the spindle which is to turn therein. After the parts are mounted in the frame the inner cone C is pushed into the outer cone till their grinding-surfaces touch. Any suitable soft metal or alloy $i$ is then melted and poured into the eye of the outer cone or shell, thus forming a close bush for the spindle. The inner cone is then drawn a little out of the other and afterward turned around therein. If it touches the other cone, it is kept in the position where it binds hardest against it, and then pushed or raised a little back into the shell. This movement forces the burr slightly to the other side from which it binds and thus centers it so exactly in the outer cone that if kept in that position it will continue to revolve without coming in contact therewith on either side. Another quantity of the alloy $j$ is then fused and poured into the bridge-tree G around the lower journal of the spindle. Meal as fine as desired can then be ground in the mill without causing the grinding-surfaces to wear away by contact with each other. A hollow cap D is placed upon the top of the driver A, and a nut $b$ screwed down against said cap upon the end of the spindle, for the purpose of supporting and adjusting the burr C. Within the cavity or hollow in the lower side of the cap is placed a number of thin washers $z$ around the spindle and resting upon a shoulder thereof. The number of these washers is such that the upper one will strike the cap and prevent the burr being raised any farther as soon as it is brought as far into the shell as practicable without bringing their grinding-surfaces into contact. As these grinding-surfaces in time become worn away by use, it will become proper to allow the inner cone to be raised farther than at first. Then one of the thin washers can be removed, and another as often as is necessary, so as to make the limit of adjustment always correspond with the progressive wearing away of the cones. With this simple contrivance it becomes impossible for a careless or inexperienced person to injure the mill by bringing the grinding-surfaces of the cones into contact.

A broad sieve H is suspended by flexible straps $r$ beneath the grinders, so as to collect all the meal as it falls therefrom. A vibratory motion is given to this sieve by means of rounded corrugations $l$ on the inner surface of the burr C, against which bears a small pulley or roller $n$, turning in the top of a lever $m$. Said lever is allowed to vibrate on a roller $a$, Fig. 4, suitably mounted in the frame of the mill. The lower arm of the lever $m$ is connected by a detachable wire or rod $o$ to a bar $p$, running across the sieve. A spring or elastic cord $q$ also passes from said bar to the frame E of the mill and serves to keep the roller $n$ in contact with the corrugations $l$, and thus produce the opposite motion to that given by said corrugations upon the sieve. The gauze or cloth is stretched upon the bottom of the sieve-frame, and two strips $s\,s$ are secured to the lower edges of the sides of said sieve-frame, so as to project a little outside of it, as seen in Fig. 8. In this projecting ledge or lip, on each side, is cut a notch, into which extend elastic stops or springs $t\,t$, secured to the frame above, and so arranged that when the sieve is driven forward by the corrugations $l$ the side of the notches will strike these springs, thereby relieving the concussion upon the vibratory lever which would otherwise result, and causing the sieve to return in its vibratory movement more promptly. These stops $t\,t$ also serve as guides to keep the sieve from swerving sidewise. A sieve thus arranged enables me to obtain from a half-bushel to three pecks of fine meal from a bushel of shelled corn.

I claim—

The combination of the long feeding-channels $w\,w$ in the grinding-surface of the burr with the discharging-channels $x\,x$, situated in positions just preceding the feeding-channels in the revolution of the burr, arranged and operating substantially in the manner and for the purposes herein specified.

JAMES CULBERTSON.

Witnesses:
J. S. BROWN,
GEO. W. ADAMS.